United States Patent
Hand et al.

(10) Patent No.: US 6,871,324 B2
(45) Date of Patent: Mar. 22, 2005

(54) METHOD AND APPARATUS FOR EFFICIENTLY AND DYNAMICALLY UPDATING MONITORED METRICS IN A HETEROGENEOUS SYSTEM

(75) Inventors: Leonard S. Hand, Trophy Club, TX (US); Jeffery R. Washburn, Roanoke, TX (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 09/865,369

(22) Filed: May 25, 2001

(65) Prior Publication Data

US 2002/0175934 A1 Nov. 28, 2002

(51) Int. Cl.[7] .................................................. G09G 5/00
(52) U.S. Cl. ........................ 715/734; 715/736; 709/223
(58) Field of Search .............................. 345/734, 736, 345/738, 771, 772, 853, 854; 709/200

(56) References Cited

U.S. PATENT DOCUMENTS

| | | | | |
|---|---|---|---|---|
| 5,261,044 A | * | 11/1993 | Dev et al. .................... 345/855 |
| 5,483,631 A | * | 1/1996 | Nagai et al. ................. 345/736 |
| 5,929,855 A | * | 7/1999 | Benton et al. ............... 345/736 |
| 6,046,742 A | * | 4/2000 | Chari .......................... 345/734 |
| 6,600,499 B1 | * | 7/2003 | MacPhail ..................... 345/772 |
| 2002/0165934 A1 | * | 11/2002 | Conrad et al. .............. 709/217 |

* cited by examiner

Primary Examiner—John Cabeca
Assistant Examiner—Ting Zhou
(74) Attorney, Agent, or Firm—Akerman Senterfitt

(57) ABSTRACT

A dynamic content delivery network node metrics reporting include a graphical display map, a multitude of components distributed across a heterogeneous network, and a plurality of agents. The graphical display map can display a plurality of nodes and visual representations of reported metric values for characterizing the components, where the nodes can represent the components. Individual ones of the nodes can include a multitude of the visual representations. The agents can probe the components for component metric values. The agents can determine the reported metric values based upon the component metric values and can convey the reported metric values to the appropriate locations within the graphical display map.

24 Claims, 5 Drawing Sheets

METHOD AND APPARATUS FOR EFFICIENTLY AND DYNAMICALLY UPDATING MONITORED METRICS IN A HETEROGENEOUS SYSTEM

BACKGROUND OF THE INVENTION

1. Technical Field

The present invention relates to the field of data monitoring and presentation, and more particularly, to a method and apparatus for efficiently and dynamically updating metrics within a complex heterogeneous system on a display map.

2. Description of the Related Art

Monitoring system performance can provide engineers and system operators with time critical information that can often help to alleviate or avert catastrophe and also design better systems. This is especially true for complex heterogeneous systems. Complex heterogeneous systems are systems that can have entities and components that are diverse in their functionality and operability. In these complex heterogeneous systems, it can often be necessary to monitor metrics defined for these systems in order to ensure that the components or entities in the system are functioning optimally. A metric is a standard of measurement that can be used for mathematical or statistical analysis. Metrics can include performance data or configuration information that can be used to setup software or hardware parameters. As the size of complex heterogeneous systems increase, so does the complexity of monitoring various metrics. Moreover, as complex heterogeneous systems become more diverse, it can become progressively more difficult to collect and analyze the various metrics collected.

For example, in complex heterogeneous systems, it can be necessary to monitor realtime performance to ensure that the network functions optimally. A content delivery network (CDN) is an example of a complex heterogeneous system and can include e-Business systems and communication networks. Since the CDN can consist of entities and diverse components, the size and heterogeneous characteristics of these CDNs can make it extremely difficult to perform real time analysis. Entities and components can include, but are not limited to servers, switches, routers, caches, load dispatchers (LD) and traffic managers. As a result, it is often required to perform tests on a scalable version of the network. Even then, personnel and expertise are required to dutifully monitor each component, entity or subsystem of the network, along with any associated applications databases and platforms. This post analysis monitoring can be time extremely consuming and very expensive.

Even in cases when performance metrics or attributes are collected, the collected data must be analyzed and presented in a manner that facilitates easy interpretation. Monitoring realtime performance requires simultaneous assessment of the performance metrics for all of the components or entities forming the CDN. Realtime values of the performance associated attributes must be available in order to determine what attributes are causing a bottleneck and what components, entities or subsystems might have resources available to accommodate additional traffic.

Importantly, the collection of system information such as performance metrics and configuration data, can involve the sending and receiving of communication messages within the system. These communication messages can include queries and responses, the latter of which can contain updated values for the metrics. In networks, the transmission of these messages involve overhead traffic than can reduce the effective throughput of these system. In heterogeneous systems, the greater the number of entities, components, metrics and configuration information, the greater the impact on the overall throughput and efficiency of these systems.

A similar problem can exist in other heterogeneous systems such as computing system environments. In these systems, it is often necessary to monitor certain system metrics in order to ensure optimal performance of the system. For example, it might be necessary to monitor performance metrics for an Operating System (OS) running on a platform. As the size and complexity of the software, its related data bases, and number of users in such systems that utilize the OS increases, so does the ability to collect and analyze metrics. Moreover, as the size and complexity of these systems increase so does the amount of information that has to be communicated in order to collect updated metrics. The increase in the amount of communication and associated processing that can be required to collect the updated metrics can severely impact the efficiency of these systems.

Given the inherent drawbacks associated with realtime collection of the metrics associated with heterogeneous systems, there exists a need to provide a more efficient approach to dynamically collecting updated metrics in these kinds of systems.

SUMMARY OF THE INVENTION

The invention discloses a method and apparatus for reporting metrics. The method can include probing a content delivery network (CDN) component for determined and undetermined ones of selected metric values which characterize the CDN component. This characteristic can include the performance of the CDN component. Determined metric values can be reported to a recipient graphical display interface. The reporting and probing steps can be repeated in order to acquire the undetermined metric values. The probing and reporting steps can occur in a first agent and the repeating step can occur in a second agent. The reporting step can include updating a first update message with the determined metric values resulting from the probing step initiated by the first agent and adding a predefined code related to undetermined values to the first update message.

The repeating step can include updating a second update message with determined metric values resulting from a probing step initiated by a second agent, wherein the determined metrics correspond to the undetermined metrics resulting from the probing initiated by the first agent. A predefined code can be added to the second update message. Values within the fields of the first and the second update message can be used to update values within the recipient graphical display. The graphical display can be updated using the determined metric values. The selected predefined code can define an action such as, disregarding a result from the probing step, indicating a problem with the probing step, and keeping an existing value of the metric without setting it. The metrics can include but is not limited to, a CPU load, network capacity, run queue size, connections, memory usage, page ins, and disk I/O, or any combination thereof.

In a further aspect of invention, the method for dynamically reporting a plurality of metrics for components of a dynamic data space can include the step of probing a component of the dynamic data space for determined and undetermined ones of selected metric values characterizing the data space. Determined metric values can be reported to a recipient graphical display interface. The reporting and probing steps can be repeated to acquire the undetermined metric values. The probing and reporting steps can occur in a first agent and the repeating step can occur in a second agent. The reporting step can include the step of updating a first update message with the determined metric values resulting from the probing step initiated by the first agent. A predefined code related to the undetermined values can be added to the first update message.

The repeating step can include the step of updating a second update message with determined metric values resulting from the probing step initiated by a second agent. The determined metrics can correspond to the undetermined metrics resulting from the probing initiated by the first agent. A predefined code related to the determined metric values can be added to the second update message. Values within the fields of the first and the second update message can be used to update values within the recipient graphical display, wherein the graphical display can be updated using the determined metric values. The predefined code can define an action which can include, but is not limited to, disregarding a result from the probing step, indicating a problem with the probing step, and keeping an existing value of the metric without setting it.

A further aspect of the invention includes a machine readable storage having stored thereon, a computer program having a plurality of code sections for reporting metrics for CDN components, the code sections executable by a machine for causing the machine to perform the step of probing a CDN component for determined and undetermined ones of selected metric values characterizing the performance of the CDN components. Determined metric values can be reported to a recipient graphical display interface. The reporting and probing steps can be repeated in order to acquire the undetermined metric values.

In yet a further aspect of the invention, a machine readable storage having stored thereon, a computer program having a plurality of code sections for reporting a plurality of metrics for components of a dynamic data space, the code sections executable by a machine for causing the machine to perform the steps of probing a component of the dynamic data space for determined and undetermined ones of selected metric values characterizing the component. Determined metric values can be reported to a recipient graphical display interface. The probing and reporting steps can be dynamically repeated in order to acquire any undetermined metric values.

In another embodiment of the invention, a dynamic network node metrics reporting system is disclosed. The system can include a graphical display map for displaying nodes and visual representations of reported metric values for characterizing network components. Nodes can be utilized to represent the components. Agents can be configured to probe the network components for determined and undetermined ones of selected metric values. The agents can have the capability to report determined metric values and predefined codes which can be used to represent the undetermined metric values to the graphical display map.

A further embodiment of the invention provides a dynamic CDN node metrics reporting system. The system can include a graphical display map for displaying a plurality of nodes and visual representations of reported metric values for characterizing components, wherein the nodes represent components. Agents can be configured to probe the components for determined and undetermined ones of selected metric values. The agents can report the determined metric values and codes representing the undetermined metric values to the graphical display map. Performance metric values can be used to characterize the components.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

Figure 1:
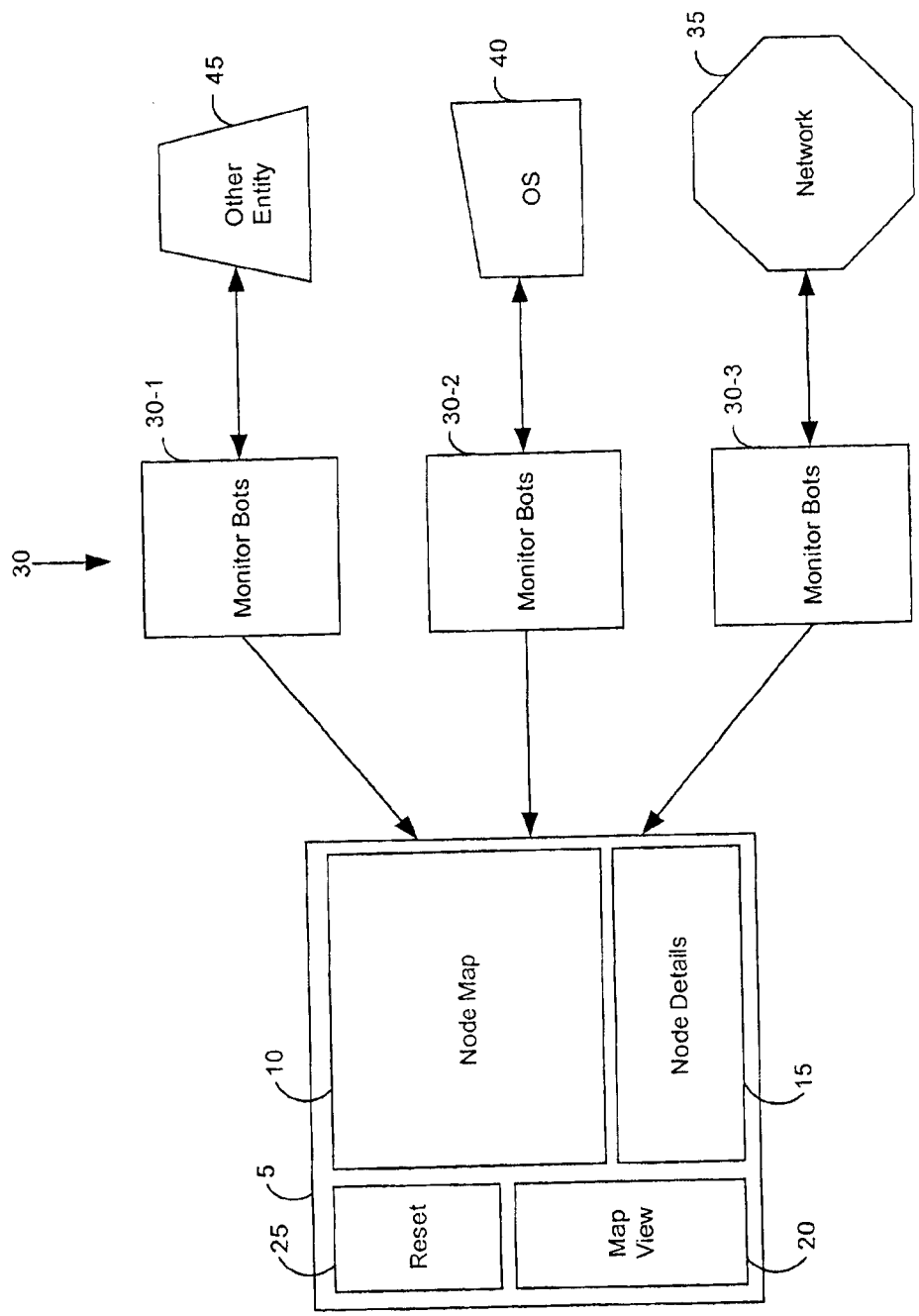
FIG. 1 is a block diagram of an architecture for a Data Metric Map.

The present invention discloses a method for dynamically reporting measured values for defined data metrics for a complex heterogeneous system. These measured values can be used for realtime monitoring and visualization in these complex heterogeneous systems. Data metrics are standards of measurements that can be used for mathematical or statistical analysis while monitoring these systems. Complex heterogeneous systems are systems that contain numerous diverse components and entities and seamlessly interoperate to provide one or more functions. Complex heterogeneous systems can include, unlimited combinations of CDN, computer networks, operating systems, databases and communication systems.

Within a complex heterogeneous system, attributes of the data metrics can be defined for the various components or entities within the system. An attribute is a type of a data metric. The values associated with the defined attributes of the data metrics can be periodically collected from the entities within the system by using agents or robots (bots). An agent can be an application or part thereof that can be designed specifically to interface with, collect and report information on a device that is being managed. The collection of remote information using agents is well known in the art. These values associated with the defined attributes for the data metrics can be mapped to symbolic representations based on the attributes. Each symbolic representation can then be viewed on a graphical display, such as a display map, and the symbolic representation is called a node. To visualize the operation of the complex heterogeneous system, the graphical display map can be updated to reflect changes in the values of the state of entities or components represented by nodes in the display map.

In accordance with the invention, a method and system for dynamically reporting measured data metric values can include reporting realtime performance metrics for communication components and entities within a complex heterogeneous network, for example, a content delivery network (CDN). Data metrics, for example performance data, for each system component and entity of the complex heterogeneous network or system can be collected and displayed in realtime on a graphical display map. Agents, referred in the art as "bots" (robot), can collect updated data metric values.

The map display can have indicators which can represent the realtime values of the system performance metrics. The performance data metrics which are displayed in the map, can be selected from a list data metrics. The invention is not limited to monitoring and visualization of realtime performance metrics for communication components and entities forming an complex heterogeneous network or system. Rather, the visualization of realtime performance metrics of communication components and entities forming a complex heterogeneous communication network is intended to teach one how to practice the invention. Furthermore, data other than performance data, for example configuration, can be monitored and visualized.

FIG. 1 shows a block diagram which illustrates an architecture of a data metrics map in accordance with the inventive arrangements. Two components of the architecture of FIG. 1, include the data metrics map display 5 and the supporting data metrics map components. The data metrics map display 5 can contain a node map display section 10, a node detail display section 15, a map view display section 20 and a reset display section 25. The data metrics map components can include a multitude of agents or monitor bots 30 (robots) such as bot 30-1, bot 30-2 and bet 30-3. Other components of the architecture can include the system to be monitored, which can be a network component 35, an operating system component 40 and a miscellaneous component 45, for example, it network, a database, an operating system and/or an application, respectively.

The data metrics map display 5 can be a graphical display window in a CRT, LCD, Plasma or LED screen which can be coupled to a computing device such as a workstation, a PC, a laptop. The map display 5 can be a GUI, for example, a Java based browser configured to process HTML, XML, WML, or similarly formatted information. The data metrics map display 5 can be divided into a plurality of display window sections, each display section serving a specific function. The node map section 10, the node detail section 15, the map view section 20 and the reset section 25 all can be windows located within the map display 5.

The heterogeneous system to be monitored and for which data can be reported, can include a network 35 consisting of workstations and other network entities, for example, routers, databases, switches, bridges, and web application servers (WAS). The system for which metric values can also be visualized can include an operating system 40 and applications which can utilize the operating system. Exemplary computing platforms can include but is not limited to, PC, Miniframe and Mainframe computers. A network management protocol can facilitate communication between the various components and entities forming the system. Network management protocols are known in the art and are used to monitoring and maintenance of these systems. Finally, the complex heterogeneous system to be monitored and for which data can be visualized can include other components or entities 45, such as databases, operating systems, load dispatchers, traffic managers and networks of communication devices.

In operation, the data metrics map display 5 can display a graphical representation of reported metrics from the components and entities within the system to be monitored. The map display 5 can dynamically change to reflect updated values for the reported metrics corresponding to the components and entities within the system being monitored. The graphical representation of the system components or entities can be displayed as icons or other suitable designators within the window of the node map section 10. In a further aspect of the invention, the graphical representation of the system components or entities displayed in node map section 10 can be connected by lines or placed in such a manner as to illustrate the relative communication relationships between the system being monitored and its constituent components.

In operation, the node details display section 15 can display data metric values and other information pertaining to each component and entity in the heterogeneous system being monitored. The metrics collected for each of the components can be displayed, for example, in a chart, graph, or a table. By comparison, the map view display section 20 can be used to control metrics to be reported, collected and displayed in the data metrics map display 5. The map view display section 20 can provide a list of the metrics to be selectively and displayed. More particularly, only those metrics which are selected in the list are displayed in the node detail display section 15. In addition, corresponding icons in the map display section 10 can be updated to indicate the updated value of the selected metrics.

Finally, the reset display section 25 can contain a selectable list of all the system components and entities. The selectable list of all the system components and entities can be used to reset all or particulars ones of the metrics in the node details display section 15 and the node map section 10. The reset function allows the metrics to be initialized or set to a default value.

In one aspect of the present invention, a maximum and a minimum value can be defined for each metric to be monitored and displayed. Various levels of quantized values can be defined for values falling between the defined maximum and the defined minimum value. Each of the quantized values can be mapped or assigned to a unique indicator. Notably, the unique indicator can be a color, varying shades of gray, and a pattern, or any combination thereof. A pattern, for example, can include variations of cross-hatched patterns. The unique indicator can be used in conjunction with the icon that represents an entity to represent the value of the metric for a metric. The unique indicator can be represented in the map view display section 20 where it can be used as a legend to reference the values indicated by the icons displayed in the map display section 10.

During a reporting phase, the data metrics map display 5 can receive updates of values pertaining to a particular metric from agents or bots 30-1, 30-2, 30-3 that monitor the components or entities 35, 40, 45 within the heterogeneous system. The updates of values pertaining to each metric can be the result of an interrogation from the bots 30-1, 30-2, 30-3 and can be contained within particular fields of an update message. In response to the interrogation from the agent or bots, the value of the requested metric can be sent to the agent or bot 30-1, 30-2, 30-3. This value of the metric can be used to update the data metrics map display 5. For example, bot 30-3 can interrogate a component of network 35 for a specific metric. In response to the interrogation request, the component of network 35 can supply the value of the requested metric to bot 30-3. The data metrics map can then be updated with the value through the reporting procedure.

Figure 3:
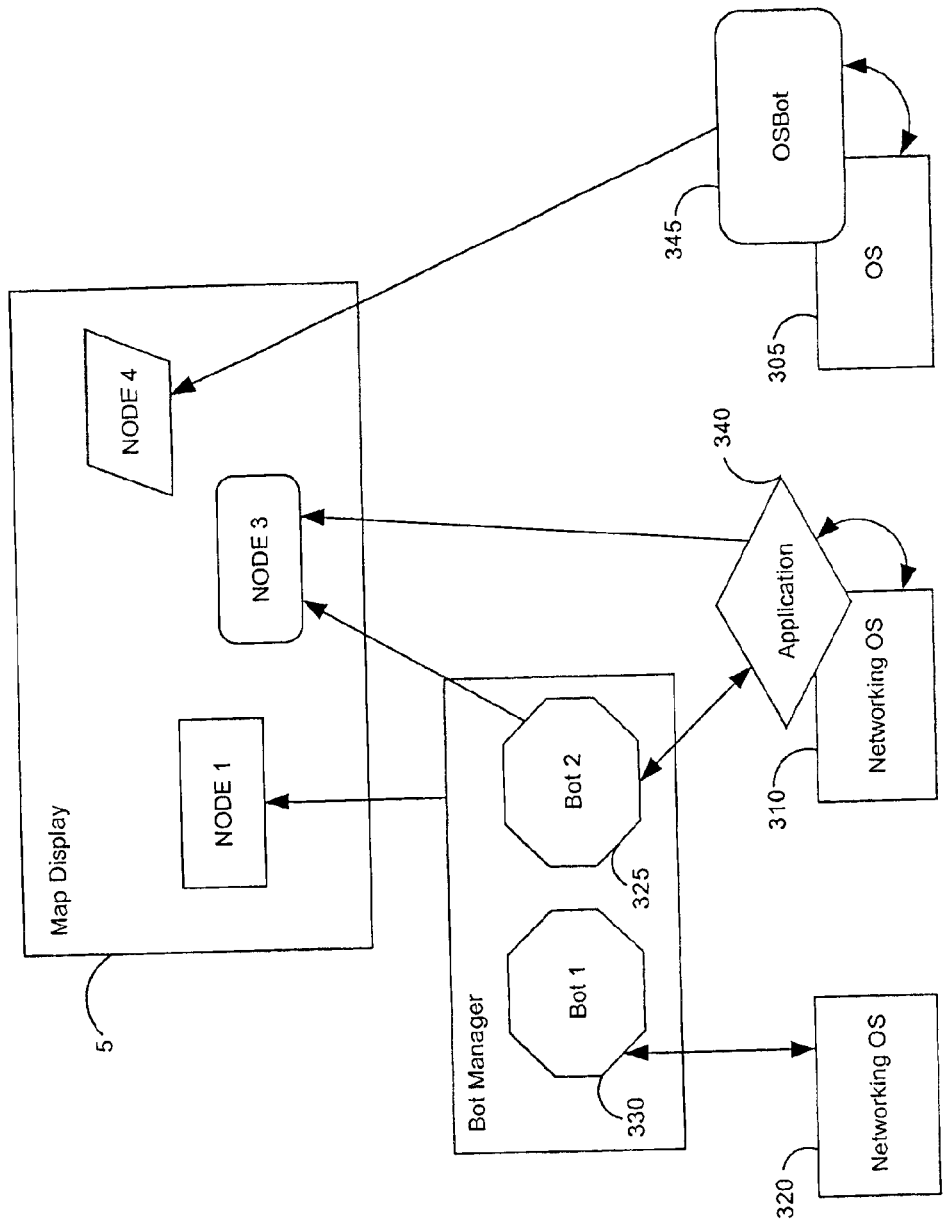
FIG. 3 is a diagram of the update process for a Data Metric Map used to monitor a CDN as shown in FIG. 2.

In a further aspect of the invention, the bots 30-1, 30-2, 30-3 can be managed by a single bot manager (shown in FIG. 3). For example, bots 30-1, 30-2 and 30-3 can be managed as a single entity. Hence, the bot manager can handle interrogation of the component or entities of the system and also update the values of the data metrics map based on the response of the interrogation.

Figure 2:
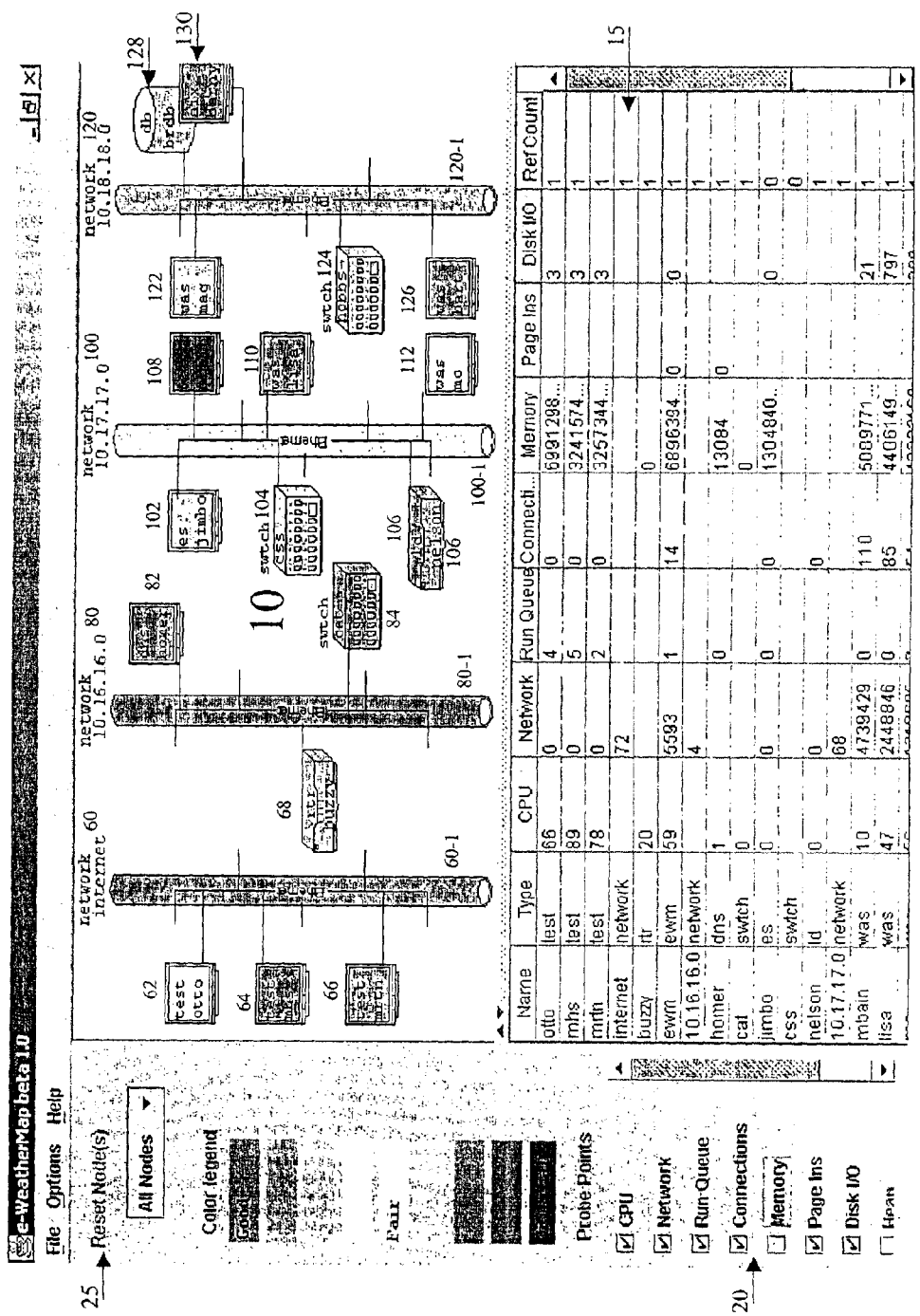
FIG. 2 is an detailed diagram of a Data Metric Map Display used to monitor a CDN.

In another aspect of the invention, there is shown in FIG. 2, a detailed diagram of a data metrics map display used to monitor a heterogeneous CDN. The data metrics map of FIG. 2 can be used to dynamically monitor the network components or entities of four networks, 60, 80, 100, and 120. Network 60, the Internet, can include three components or entities, namely, a work station "otto" 62, a work station "mhs" 64, a work station "mrtn" 66. Network 80, having an IP address of 10.16.16.0, can have 3 components or entities. Namely, a domain name server (DNS) "homer" 82, a switch (swtch) "cat" 84, and a router component (rtr) "buzzy" 68. Network 100, having an IP address of 10.17.17.0, can include 6 components or entities. Namely, an edge server "jimbo " 102, a switch (swtch) "css" 104, a local director (Id) "nelson" 106, a web application server (WAS) "mbain" 108, a web application server (WAS) "lisa" 110, and a web application server (WAS) "mo" 112. Network 120, having an IP address of 10.18.18.0, can include 4 components or entities. Namely, a web application server (WAS) "mag" 122, a (swtch) "hobbs" 124, a web application server (WAS) "bart" 126, an AIX machine "barny" 130 and an database server "brdb" 128.

The graphical representation of the system components and entities to be displayed in the map display section 10 of the data metrics map can be icons. In one embodiment, a vertical cylindrical icon can be used to represent the backbone of the network. For example, the backbone of network 60 can be represented by a vertical cylindrical icon 60-1. The backbone of network 80 can be represented by a vertical cylindrical icon 80-1. The backbone of network 100 can be represented by a vertical cylindrical icon 100-1. The backbone of network 120 can be represented by a vertical cylindrical icon 120-1. An icon illustrating a monitor can used to represent workstations/servers within the communication system being monitored. For example, workstations 62, 64, 66, 82, 108, 110, 112, 122, 126, and 130 can be represented by a monitor icon. The workstation can be a PC, a laptop, a conventional diskless workstation or a conventional workstation having a disk. An icon of a router can be used to represent components or entities that are function as routers in the system. For example, router 68 and local director 106 have similar icons. An icon of a switch can be used to represent switches in the system. For example, switches 84, 104, and 124 can be represented by the switch icon. The domain name server 82, edge server 102, and the web application servers 108, 110, 112 and 122 can be represented with a similar icon as a workstation. A conventional database icon can be used to represent database 128.

The node map section 10 can show the inter-relation between the various system components or entities. For example, the components of network 80 can be shown to be associated with network 80 by connecting the router 68 icon, the domain name server 82 icon and the switch 84 icon by lines to the central backbone 80-1 icon. It should readily be understood that the icons are arbitrarily assigned and are not intended to be a limitation on the system.

The node detail display section 15 can display the name of the components or entities to be monitored and the value for the metrics. Referring to FIG. 2, the node detail display section 15 can be arranged in a tabular form. The name of the components or entities to be monitored can be located in the first column of the table. For example, the first entry, row one column 1, can contain the header "Name." The second entry, row 1 column 2, can contain the header "Type," which lists the type of component or entity. The components or entities along with their type can be listed respectively as shown: "otto" with a type of test, "mhsm" with a type of test, "mrtn" with a type of test, "Internet" with a type of network, "buzzy" with a type of router (rtr), "ewm" with a type of "ewm", 10.16.16.0 with a type of network, "homer" with a type of domain name server (DNS), "cat" with a type of switch (swtch), "jimbo" with a type of es, "css" with a type of switch (swtch), "nelson" with a type of local director, 10.17.17.0 with a type of network, "mbain" with a type of web application server (was), and "lisa" with a type of web application server (was).

The name of the metrics to be monitored for the components or entities can be placed in the first row of the table in the node detail section 15, starting at the third column. The names can be used as headers for each column. For example, the metrics to be monitored for each component or entity of the system can include, CPU usage (CPU), Network Usage (Network), Run Queue, Connections, Memory, Page Ins, and Disk I/O, respectively. The corresponding value of a metric for a specific component or entity can be located at the position where the metric column intersects the entity or component row.

The map view display section 20 can contain a list of probe points. Probe points are metrics that can be measured for the components or entities forming the heterogeneous system. Referring to FIG. 2, the list of probe points or metrics to be monitored can include: CPU usage (CPU), Network Usage (Network), Run Queue, Connections, Memory, Page Ins, and Disk I/O. In one aspect of the invention, the probe points or metrics are selectable. The selection of a probe point or metric can occur by placing a check mark next to the probe point or metric. The selection of the probe point or metric can determine what metrics gets displayed in the map display section 10 of the data metrics map. By having seven selectable probe points, there are 128 or $2^n$ possible views for metrics of the components or entities forming the system.

As the updates containing the metric values for monitored components and entities are received, the corresponding locations in the table of the node detail section 15 can be dynamically updated. The update process can occur in realtime or it can be delayed. The node map display section 10 can also be updated whenever updated values for the are received. Based on which probe points or metrics are selected in the map view display section 20, the appropriate icons representing the component or entity will be updated to reflect the updated value for the metric.

As an illustrative example, the updated value for the CPU usage of WAS "mo" 112 is 7%. The attributes for the CPU usage can be defined as follows. The maximum CPU usage for the system can be 100% and the minimum can be 1%. The CPU usage can be quantized into discrete values and each discrete value represented by a different color as follows: 1–10%: RED, 11%–20%: ORANGE, 21%–30%: YELLOW, 31%–40%: BLUE, 41%–50%: INDIGO, 51%–60%: VIOLET, 61%–70%: TEAL, 71%–80%: LIGHT GREEN, and 80%–100%: DARK GREEN. The 80–100% range indicated in red can signify a critical state. The 41%–50% range represented in indigo, can represent a fair state. The 11%–20% range indicated in orange, can represent a good state. The 1%–10% range indicated in dark green, can represent an excellent state.

Varying operating states can exists between these states. Since the updated value of the CPU usage for "mo" was 7%, then the icon for 112 would be represented in the color red indicating that a critical state exists for "mo." If further, the updated memory usage value for "mo" was 95%, leaving insufficient memory for the CPU to operate, then if memory was also selected in the map view display section 20, the value of 95% can fall into a critical range and the icon 112 for "mo" can be changed to reflect the new value in the node map display section 10.

As a result, the icon for "mo" 112 requires a method for accurately indicating multiple metrics values when many different metrics are selected for display. In one aspect of the invention, the metrics can be prioritized for display. As a result of this priority scheme, only the metric with the highest priority gets selected for display on the map. Hence, if CPU was given a higher priority than the memory usage, then the icon displayed in the node map section 10 for 'mo' would be red indicating that the CPU usage was critical. However, both critical values would be displayed in the table of the node detail section 15 of the map. In a further aspect of the invention, critical values that are displayed in the table of the node map section 10 can be colored and or made to flash.

In a further aspect of the invention, whenever there are more than one critical states for an entity or component, the icon for that component or entity can be made to flash within the node map window 10 and/or the node detail window 15. During operation, a user will notice the flashing critical state and can then consult the node detail section 15 to determine the actual metrics that are causing the critical condition. Additionally, a user viewing the map display section 10 could uncheck the checked selection in the map view display section 20, and then selecting one at a time, those probe points or metrics that were previously checked. This would instantly show each of the metrics that where causing the critical states.

In accordance with the inventive arrangements, the agents or bots can be used to acquire values for the metrics and update the data metrics map accordingly. FIG. 3, is a block diagram illustrating three components of a network: an operating system component 305, a networking OS component 310 and a networking OS component 320. The operating system component 305 can contain an operating system bot 345 (OSBot) that can reside within an operating system component platform 305. The OSBot 345 can interrogate the component directly and update the data metrics map metrics values for the OS component 305.

In operation, bot 1 (330) can interrogate networking OS component 320 in order to acquire values for specified data metrics through bot 1 (330). In response to this interrogation request, the networking OS component 320 can send the value for the requested data metrics to bot 1 (330). On receipt of the updated value for the data metric, the bot 1 (330) can update the appropriate node, node 1, of the data metrics map with the updated value for the data metrics through a reporting procedure.

The networking OS component 310 can contain an application, for example, application 340. Application 340 can be integrated within the networking OS component 310 or it can reside externally to the networking OS component 310. In one aspect of the invention, the application 340 can interrogate networking OS component 310. Upon interrogation of the network OS component 310, application 340 can update node 3 of the map display 5. Moreover, bot 2 (325) can independently interrogate the networking OS component 310 for updated values for specified data metrics. Upon receipt of these updated value, bot 2 (325) can also update node 3 of the display map 5. It should be readily understood that although a bot, such as bot 2 (325), can interrogate a component or entity, a bot can otherwise influence a component or entity, for example by accessing that component or entity. The bot can acquire any updated data metrics and accordingly update a node.

The OS component 305 can contain an OSBot 345. The OSBot 345 can be integrated within the OS component 305 or it can reside externally. In operation, OSBot 325 can interrogate the OS component 305 for updated values for specified data metrics. On receipt of the updated values, the OSBot 345 can directly update the appropriate node, node 4, of the map display 5.

Figure 4:
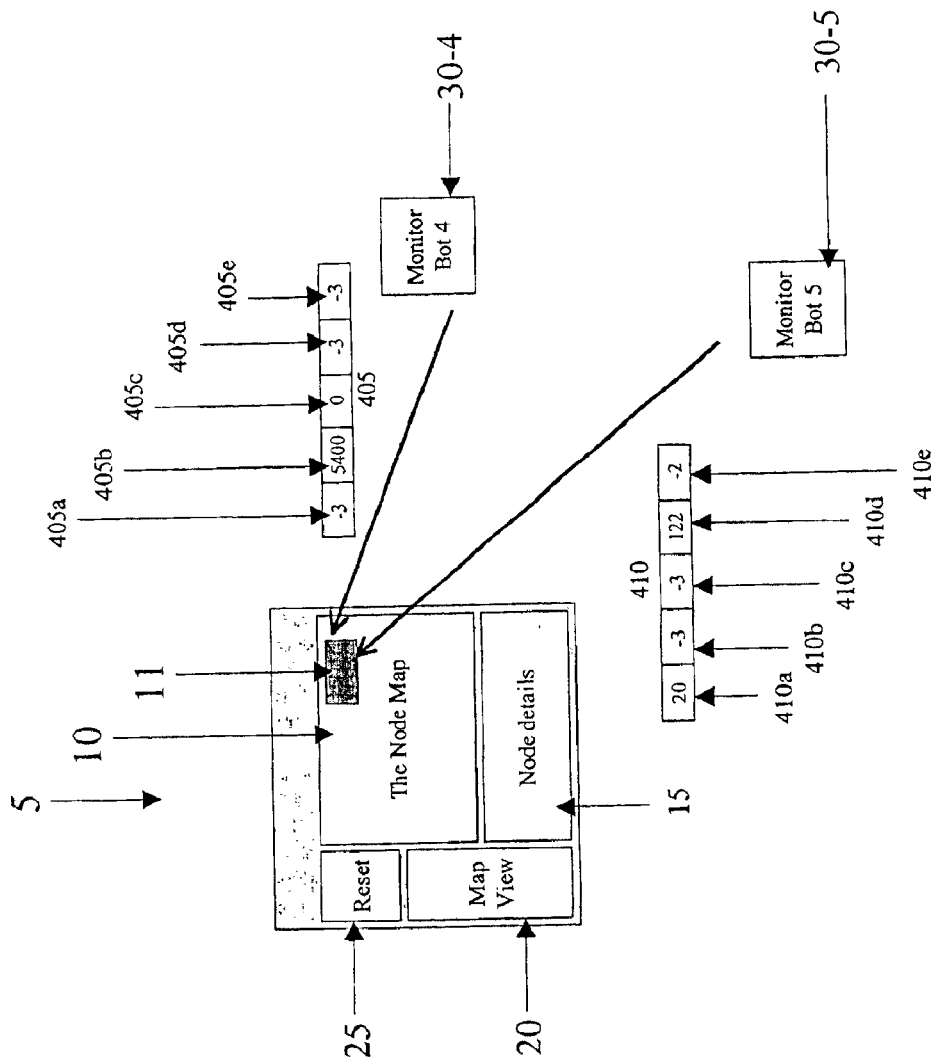
FIG. 4 is a diagram illustrating a multiple agent or bot update.

Turning now to the reporting aspects of the invention and particularly, the ability of more than one agent or bot to collect information from an entity or component, there is shown in FIG. 4, an exemplary metrics reporting procedure. Monitor Bot 4 (30-4) can interrogate a component of the system to acquire current values for the attributes or metrics. The message 405 can be an update message. There is shown a message having 5 data fields: 405*a*, 405*b*, 405*c*, 405*d*, and 405*e*. Each field of an update message can represent a particular attribute. The fields of an update message can contain actual values or codes that can instruct the display map 5 to take particular actions. As a result of the interrogation by bot 4 (30-4), the update message 405 contains two updated fields, namely, 405*b* containing a value of 5400 and 405*c* containing a value of 0.

The remaining fields, 405*a*, 405*d* and 405*e*, contain a unique code of −3. For illustrative purposes, the unique code of −3 can be used to instruct the map display 5 not to set the corresponding attribute represented by fields 405*a*, 405*d* and 405*e*. It should readily be understood that other codes can be utilized and the selection of this code is not intended to be a limitation on the system. On receipt of the update message 405, the node 11, which can be a graphical representation of the component, can be accordingly updated. The attribute represented by 405*b* and 405*c* will be updated for Node 11 in the map 10 to reflect the values 5400 and 0 respectively. The attributes represented by 405*a*, 405*d* and 405*e* will not be set, and any existing value displayed by node 11 will remain for those attributes. The updated values for the attributes, and also the codes can also be displayed in the node details section 15 of the display map.

In a subsequent interrogation by agent or monitor ho: 5 (30-5), the update message 410 shows the results and the codes contained in the fields of the message. The attributes representing the fields of the update message 410 can correspond exactly to the attributes for the fields of the update message 405. Since The previous interrogation had acquired values for attributes corresponding to fields 405*b*, and 405*c*, there is no need to update the map display 5 with values for these attributes. Hence, in update message 410 the fields 410*b* and 410*c* can be set to −3. The −3 code of can be used to instruct the map display 5 not to update the values for these attributes but to maintain any current values for these attributes that exist in the map.

As a result of the interrogation, update message 410 can have values of 20 and 122 for the attributes represented by fields 410*a* and 410*d* respectively. These acquired updated values will overwrite the corresponding values for the attributes represented by 410*a* and 410*d*. During this subsequent interrogation, the agent or bot was unable to acquire the value for the attribute represented by field 410*e*. As a result, a code of −2 in the attribute field 410*e* can used to indicate this condition to node 11 of the map display 5. A subsequent interrogation by bot 4 (30-4), bot 5 (30-5), or another bot can be used to acquire an updated value for the attribute represented by the field 410*e*.

Figure 5:
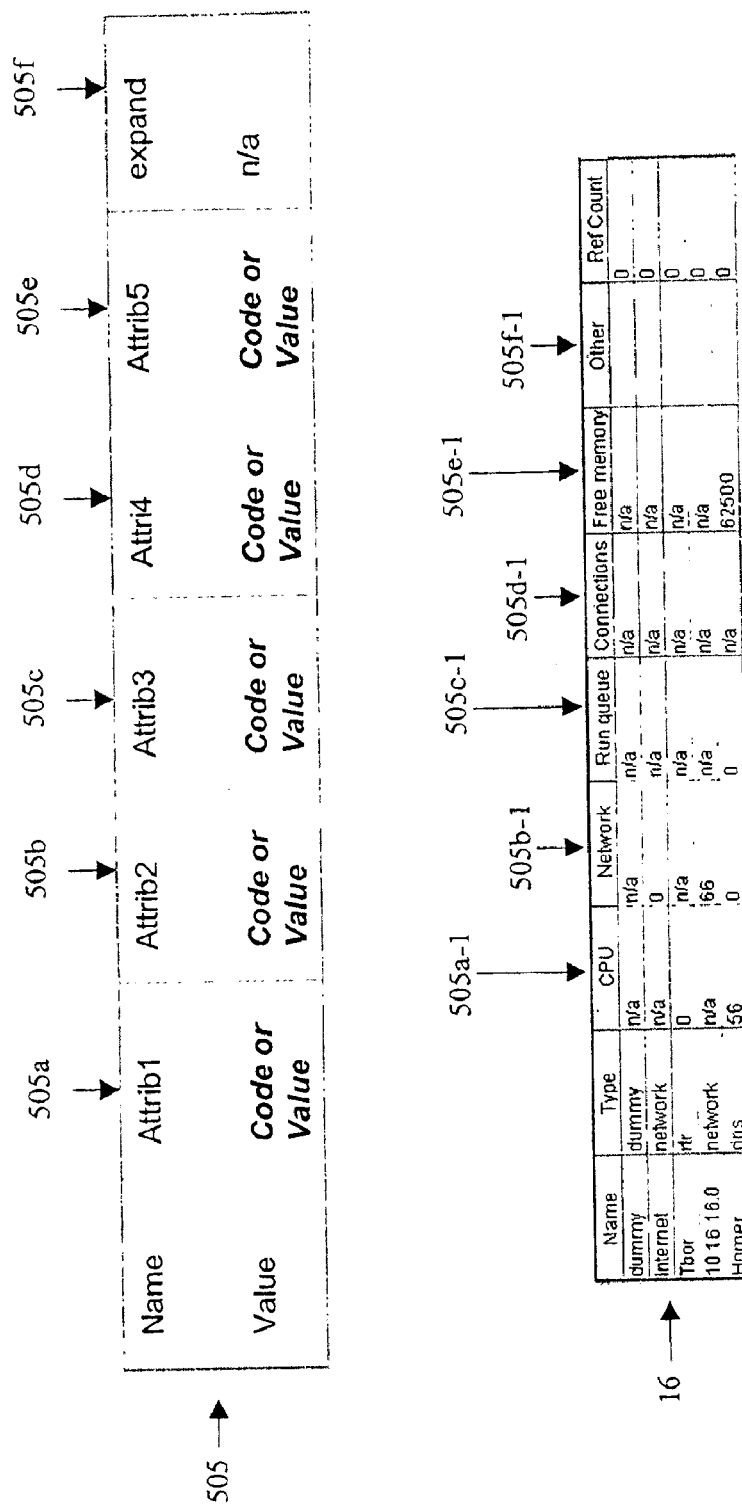
FIG. 5 is an exemplary update message showing the correspondence of attribute fields of a message with the display map as shown in FIG. 1.

With reference to FIG. 5, there is shown an exemplary format for an update message 505. The message 505 can be used to update six attributes, values for which can be located in fields 505a, 505b, 505c, 505d, 505e, and 505f. Field 505f is depicted as being used for future growth and is not currently representing an attribute. Also shown in FIG. 5 is a portion of map display 5 containing a partial node details section 16. The node details section 16 show six attributes or metrics that are being monitored for a network. The attributes include the CPU usage 505a-1, 505b-1, 505c-1, 505d-1, 505e-1. The field 505f-1 is reserved for future use or expansion. A correspondence between the fields of the message and the node detail section 15 can be made by matching the reference numbers. In operation, the corresponding entries in the table for each attribute can be updated as the corresponding node representation in the map 10 gets updated.

The present invention can be realized in hardware, software, or a combination of hardware and software. A method and system for efficiently and dynamically updating monitored metrics in a complex heterogenous system according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

While exemplary systems and methods embodying the present invention can be shown by way of example, it should be understood that the invention is not limited to these embodiments. Modifications can be made by those skilled in the art, particularly in light of the foregoing teachings. For example, each of the elements of the aforementioned embodiments may be utilized alone or in combination with elements of the other embodiments. Likewise, the invention can be applicable to any content delivery system.

What is claim is:

1. A dynamic network node metrics reporting method, comprising:
    probing a content delivery network (CDN) component for determined and undetermined ones of selected metric values characterizing the performance of said CDN component;
    reporting said determined metric values to a recipient graphical display interface by updating a first update message with said determined metric values resulting from said probing step and by adding to the first update message, a predefined code, where the predefined code relates to the undetermined values; and
    repeating said probing and said reporting steps for said undetermined metric values, wherein said probing and said reporting steps occur in a first agent, and wherein said repeating step occurs in a second agent.

2. The method according to claim 1, wherein said repeating step comprises:
    updating a second update message with determined metric values resulting tiara said probing initiated by a second agent, said determined metrics corresponding to said undetermined metrics resulting from said probing initiated by said first agent; and
    adding a predefined code to said second update message, said predefined code relating to said determined metric values in said first update message.

3. The method according to claim 2, wherein values within said fields of said first and said second update message are used to update values within said recipient graphical display, where said graphical display is updated using said determined metric values.

4. The method according to claim 2, wherein said selected predefined code defines an action selected from the group consisting of disregarding a result from said probing step, indicating a problem with said probing step, and keeping an existing value of said metric without setting it.

5. The method according to claim 1, wherein said metrics is at least one selected from the group consisting of a CPU load, network capacity, run queue size, connections, memory usage, page ins, and disk I/O.

6. A method for dynamically reporting a plurality of metrics for components of a dynamic data space, comprising:
    probing a component of the dynamic data space for determined and undetermined ones of selected metric values characterizing the data space;
    reporting said determined metric values to a recipient graphical display interface by updating a first update message with the determined metric values resulting from said probing step and by adding to the first update message a predefined code, where the predefined code relates to the undetermined values; and
    repeating said probing and reporting steps for said undetermined metric values, wherein said probing and reporting step occurs in a first agent, and wherein said repeating step occurs in a second agent.

7. The method according to claim 6, wherein said repeating step comprises:
    updating a second update message with determined metric values resulting from said probing initiated by a second agent, said determined metrics corresponding to said undetermined metrics resulting from said probing initiated by said first agent; and
    adding a predefined code to said second update message, said predefined code relating to said undetermined metric values in said first update message.

8. The method according to claim 7, wherein values within said fields of said first and said second update message are used to update values within said recipient graphical display, wherein said graphical display is updated using said determined metric values.

9. The method according to claim 7, wherein said selected predefined code defines an action selected from the group consisting of disregarding a result from said probing step, indicating a problem with said probing step, and keeping an existing value of said metric without setting it.

10. A machine readable storage having stored thereon, a computer program having a plurality of code sections, said code sections executable by a machine for causing the machine to perform the steps at:
    probing a CDN component for determined and undetermined ones of selected metric values characterizing the performance of said CDN component, the code sections for reporting metrics for said CDN components;

reporting said determined metric values to a recipient graphical display interface by updating a first update message with the determined metric values resulting from said probing step and by adding to the first update message a predefined code, where the predefined code relates to the undetermined values; and repeating said probing and said reporting steps for said undetermined metric values, wherein said probing and said reporting steps occur in a first agent, and wherein said repeating step occurs in a second agent.

11. The machine readable storage according to claim 10, wherein said repeating step comprises:

updating a second update message with determined metric values resulting from said probing initiated by a second agent, said determined metrics corresponding to said undetermined metrics resulting from said probing initiated by said first agent; and adding a predefined code to said second update message, said predefined code relating to said determined metric values in said first update message.

12. The machine readable storage according to claim 11, wherein values within said fields of said first and said second update message are used to update values within said recipient graphical display, where said graphical display is updated using said determined metric values.

13. The machine readable storage according to claim 11, wherein said selected predefined code defines an action selected from the group consisting of disregarding a result from said probing step, indicating a problem with said probing step, and keeping an existing value of said metric without setting it.

14. The machine readable storage according to claim 10, wherein said metrics is at least one selected from the group consisting of a CPU load, network capacity, run queue size, connection, memory usage, page ins capacity, and a disk I/O.

15. A machine readable storage having stored thereon, a computer program having a plurality of code sections, the code sections executable by a machine for causing the machine to perform the steps of:

probing a component of the dynamic data space for determined and undetermined ones of selected metric values characterizing said component, the code sections for reporting a plurality of metrics for components of a dynamic data space;

reporting said determined metric values to a recipient graphical display interface by updating a first update message with the determined metric values resulting from said probing step and by adding to the first update message a predefined code, where the predefined code relates to the undetermined values; and repeating said probing and reporting steps for said undetermined metric values, wherein said probing and said reporting steps occur in a first agent, wherein said repeating step occurs in a second agent.

16. The machine readable storage according to claim 15, wherein said repeating step comprises:

updating a second update message with determined metric values resulting from said probing initiated by a second agent, said determined metrics corresponding to said undetermined metrics resulting from said probing initiated by said first agent; and adding a predefined code to said second update message, said predefined code relating to said determined metric values in said first update message.

17. The machine readable storage according to claim 16, wherein values within said fields of said first and said second update message arc used to update values within said recipient graphical display, wherein said graphical display is updated using said determined metric values.

18. The machine readable storage according to claim 16, wherein said selected predefined code defines an action selected from the group consisting of disregarding a result from said probing step, indicating a problem with said probing step, and keeping an existing value of said metric without setting it.

19. The machine readable storage according to claim 16, wherein said component is a CDN component.

20. A dynamic CDN node metrics reporting system, comprising:

a graphical display map for displaying a plurality of nodes and visual representations of reported metric values for characterizing components, said nodes representing said components, wherein individual ones of said nodes are include a plurality of said visual representations;

a plurality of said components distributed across a heterogeneous network; and a plurality of agents configured to probe said components for component metric values, said agent determining said reported metric values based upon said component metric values and conveying said reported metric values to said graphical display map, wherein said reported metric values include values representing said component metric values that are displayed as said visual representations and control values that are not displayed as said visual representations.

21. The system of claim 20, wherein each of said agent is a platform-independent software object.

22. The system of claim 21, wherein said agents are distributed across said heterogeneous network.

23. The system of claim 20, wherein at least one of said nodes includes a plurality of said visual representations for that node.

24. The system of claim 23, wherein said plurality of visual representations for said node are based upon reported metric values conveyed to said node from a plurality of different agents.

* * * * *